Sept. 21, 1926.  
C. H. NADIG  
1,600,481  
VALVED HOSE NOZZLE  
Filed March 28, 1923
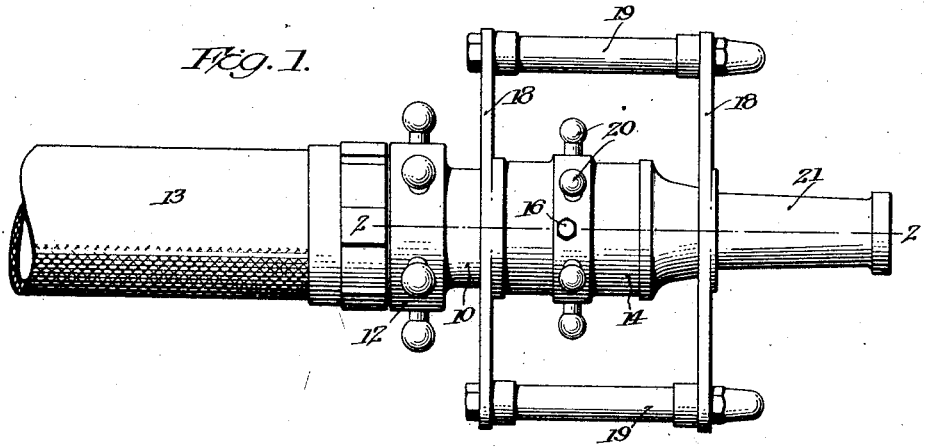
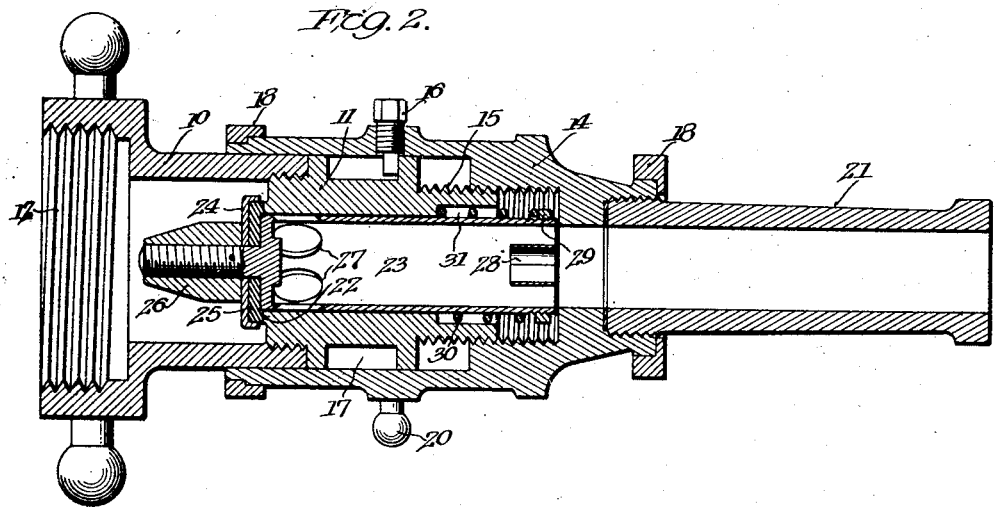
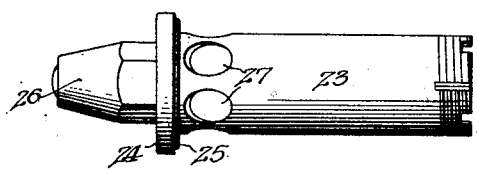
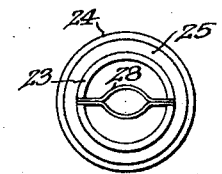
Inventor  
Charles H. Nadig.  
By Emery, Booth, Janney & Varney  
his Attorney Patented Sept. 21, 1926.

1,600,481

UNITED STATES PATENT OFFICE.

CHARLES H. NADIG, OF ALLENTOWN, PENNSYLVANIA.

VALVED HOSE NOZZLE.

Application filed March 28, 1923. Serial No. 628,336.

This invention aims to improve valved nozzles, faucets, spigots and the like, for controlling the discharge of liquids from pipes and containers. The invention aims to provide a simple, compact, durable nozzle, readily operated to control with precision the flow of liquid and maintaining itself tight without attention under all conditions of use.

Further aims and advantages of the invention appear in connection with the description of the illustrative embodiment shown in the accompanying drawings, wherein—

Fig. 1 is a side view of a valved nozzle for hose pipes;

Fig. 2 is a longitudinal section of the same on the line 2—2 in Fig. 1;

Fig. 3 is a side view of the movable valve member removed from the nozzle; and

Fig. 4 is an end view of the valve member shown in Fig. 3.

The form of the invention illustrated in the drawings is intended particularly for fire department and similar service where strength and reliability of operation are essential to satisfactory performance, and quick and certain control is highly desirable; but the invention is equally applicable to commercial, household and other less exacting service.

Referring to Figs. 1 and 2, the shut-off device therein shown comprises a body 10 which, in the form shown, is made in two parts, the valve containing nipple 11 being removable for convenience in manufacture and to facilitate repair. The body has suitable means, such as a screw threaded flange 12, at one end for connecting it to a hose or other pipe 13, and a nozzle 14 at the opposite end. The nozzle 14 is adjustably secured to the nipple portion of the body by any suitable means, such as a screw joint 15, and is prevented from unscrewing to the point of separation from the body by means of a set screw 16, engaging in a groove 17 cut around the body. The nozzle is mounted for rotation in a frame 18 provided with handles or grips 19, and may be rotated by any convenient means, such as the radially projecting knobbed spokes 20, readily grasped by the hand, or by the fingers or thumb while the hand grips the handle to hold the device. The nozzle may be provided with a removable tip 21 of the desired size of orifice for directing the stream. In the form shown in the drawings, the orifice is the same size as the discharge opening from the valve.

The nipple 11 has a flat seat 22 formed on a shoulder concentric with the discharge passage. This seat faces the end of the valve body through which the liquid enters (see Fig. 2) and is adapted to cooperate with an axially slidable valve 23 arranged in the discharge passage to close the passage when the valve is seated thereon. The valve is tubular for the greater part of its length, one end (that near the seat 22) being closed and the other end (which projects out of the discharge end of the discharge passage) being open. The closed end of the valve 23 has an axial stud carrying a circumferentially projecting cup or flange 24 for supporting the packing 25 against the valve seat 22 when the valve is closed. A nut 26 or other suitable retaining means enables the flange and packing to be removed, if necessary, for cleaning or renewal. The valve 23 is provided with suitably shaped orifices 27 in its side wall near its closed end for admitting liquid into the discharge passage when the valve is unseated, and for aiding in controlling the amount of flow, the latter depending on the amount of opening of the valve and consequent uncovering of the orifice. An axially extending diaphragm or vane 28 is arranged in the discharge end of the valve passage for preventing swishing and splashing of the water or other liquid emerging from the nozzle.

The valve 23 may advantageously be held in place in the discharge passage in the body by means of a screw collar 29 on its open end and a compressible spring 30 surrounding its open end between the collar and the nipple end of the body. The spring is received in a counterbore or enlargement 31 of the discharge passage and its inner end abuts against the shoulder in the body at the inner end of this counterbore. This spring tends to hold the valve 23 against its seat, and when the valve is forced off from its seat by screwing the nozzle 14 toward the body (to the left in Figs. 1 and 2) the spring is compressed into the counterbore 31.

The operation of the device is extremely simple, merely rotating the nozzle with reference to the body so as to screw it toward the valve moves the valve away from its seat to expose the ports 27 more or less as is necessary to permit the flow of the quantity of water desired. Screwing the nozzle the opposite way permits the valve to return under the influence of the pressure of liquid and the spring 30 until it seats, thereby cutting off the flow. The valve will remain in any intermediate position to which it may be moved by the rotation of the nozzle until the nozzle is further rotated.

There are no metal to metal joints requiring attention to maintain tight, and which are liable to corrode and stick; and there is little, if any, danger of injuring the packing 25 because the valve cannot be forced shut against its seat by the screw nozzle. Furthermore, by removing the set screw 16 and unscrewing the nozzle from the body, all parts are readily taken off or out for inspection and cleaning. The packing 25 may readily be renewed when worn out, but if a good grade of steam packing be used this will be seldom. This packing is soft enough to maintain a tight fit against the seat, and tough enough to stand the pressure and wear of the water. As there is no movement of the valve upon its seat there is no wear from this cause.

The form of valve and nozzle permits the flow in a solid stream without splashing at all stages of opening.

The invention is particularly advantageous for pipe systems where it is desirable to open and close the shut-off valve without causing shock from rapid changes in pressure or velocity in the pipe.

Having described an embodiment of my invention for purposes of illustration, without restricting myself thereto, I claim and desire to secure by Letters Patent the following:—

1. A hose nozzle comprising a body having an axial discharge passage, a valve slidably arranged in said passage, said valve arranged to seat upon the inner end of said passage, a nozzle member adjustably secured upon the discharge end of said body and adapted to engage said valve and shift it axially to move it away from its seat, and handle means including a frame rotatably secured to said nozzle member.

2. A valved hose nozzle comprising, in combination, a tubular body member adapted for attachment to a hose and presenting a valve seat near its inner end, a tubular valve slidably arranged in said body and adapted to said seat, a nozzle threaded on the outer end of said body having means for engaging said valve for moving it away from said seat, said body presenting a counter-bore at its outer end and said valve presenting a shoulder beyond the end of said body, and a spiral spring surrounding said tubular valve arranged in said counter-bore and engaging said shoulder for maintaining said valve in operative engagement with said nozzle, and to maintain said valve in assembled relation.

3. A valved hose nozzle comprising, in combination, a body portion, a tubular valve axially arranged in said body portion, means for actuating said valve, and a transverse vane secured in slots in said tubular valve adjacent the discharge end adapted to prevent splashing or swishing of the liquid discharging therefrom before it enters the nozzle tip.

In testimony whereof, I have signed my name to this specification.

CHARLES H. NADIG.